United States Patent
Fussnegger et al.

(10) Patent No.: US 6,239,206 B1
(45) Date of Patent: *May 29, 2001

(54) COMPLEXES OF HEAVY METAL IONS AND A POLYMER, AND THEIR USE FOR SELECTIVE REMOVAL OF COMPOUNDS FROM LIQUIDS

(75) Inventors: Bernhard Fussnegger, Kirrweiler; Stefan Stein, Saulheim, both of (DE)

(73) Assignee: BASF Aktiengesellschaft, Ludwigshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,126

(22) Filed: Dec. 20, 1996

(30) Foreign Application Priority Data

Dec. 20, 1995 (DE) ................................ 195 47 761

(51) Int. Cl.⁷ ........................................................ C08J 3/00
(52) U.S. Cl. ........................ 524/440; 426/271; 426/330.4; 426/422
(58) Field of Search ............................ 524/440; 426/271, 426/330.4, 422

(56) References Cited

U.S. PATENT DOCUMENTS

| 4,451,582 | 5/1984 | Denzinger et al. | 521/38 |
| 5,094,867 | 3/1992 | Detering et al. | 426/271 |

*Primary Examiner*—Peter D. Mulcahy
(74) *Attorney, Agent, or Firm*—Keil & Weinkauf

(57) ABSTRACT

Novel polymer complexes based on a polymer which contains copolymerized 50–99.5% by weight of at least one basic heterocycle having a $pK_a$ of at least 3.8.

Use of the complexes of the invention for removing interfering compounds from liquids and in particular beverages, especially for removing sulfur compounds from wine or wine-like beverages.

17 Claims, No Drawings

COMPLEXES OF HEAVY METAL IONS AND A POLYMER, AND THEIR USE FOR SELECTIVE REMOVAL OF COMPOUNDS FROM LIQUIDS

The present invention relates to complexes of heavy metal ions and a polymer which are suitable for selective removal of undesirable or interfering organic or inorganic compounds from liquids.

To enhance the sensory quality of water and beverages, it is frequently necessary to remove metal ions or other undesirable constituents. Polymeric sorbents have already been used for this purpose. Thus, DE-A-1945749 describes a process for removing phenols and/or metals from an aqueous medium (including beverages) using a polymeric sorbent which contains basic or cationic groups. Use of the described sorbent specific to beverages is restricted to removing very low amounts of iron and copper from beer (Fe content: 0.26 ppm, Cu content: 0.06 ppm). High sorption capacity is therefore not required.

EP-A-88964 describes a process for preparing insoluble polymers which can swell only a little in water and are made of a basic N-vinylheterocycle, and copolymers thereof with up to 30% by weight of copolymerizable monomer. Complexing transition metal cations for preparing catalysts based on the described polymers is proposed. These polymers, especially as adsorber resins, have a broad spectrum of application. They adsorb proteins very well, especially enzymes, and are also suitable for removing interfering polyphenols and dyes from aqueous solutions by adsorption.

EP-A-438713 describes a process for removing heavy metal ions from beverages by using polymers based on N-vinylheterocycles and copolymerizable monomers, which were prepared in the absence of an initiator. The same polymers are used according to EP-A-641521 for removing aluminum ions from beverages.

Polymer-metal complexes are frequently used as catalysts. DE-A 24 37 133 thus describes an oxygen-sensitive polyvinylpyridine-copper complex and its use as catalyst for carboxylating alcohols. U.S. Pat. No. 3 652 676 discloses a polyvinylpyridine-transition metal complex as hydroformylation catalyst, which was prepared using an initiator.

Surprisingly, it has now been found that complexes may be prepared, based on the polymers described in EP-A-438713 and EP-A-641521, which are outstandingly suitable for selective removal of undesirable organic or inorganic compounds from liquids. The complexes can also be used as catalysts.

The invention therefore relates to complexes of heavy metal ions and a polymer which contains 50–99.5% by weight of at least one basic vinylheterocycle having a $pK_a$ of at least 3.8 and, copolymerized, 0–49.5% by weight of another copolymerizable monomer and which is obtainable in the absence of polymerization initiators in the presence of 0.5–10% by weight of a crosslinker, based on the monomers.

For the purposes of the invention, basic vinylheterocycles are saturated and aromatic heterocycles containing a vinyl group and at least one basic tertiary ring nitrogen having a $pK_a$ of at least 3.8. Apart from the vinyl, the ring can also bear 1, 2 or 3 alkyls having 1 to 4 carbons, phenyl or benzyl and/or can also be fused to a second saturated or aromatic ring. Preferably, the polymer comprises a 5- or 6-membered vinylheterocycle which has one or two ring nitrogens and which can have one or two of the said groups as substituents and/or can be benzo-fused. Particularly preferably, they are unsubstituted or substituted vinylpyridines or N-vinylimidazoles. Specific examples are: N-vinylimidazole (VI) and derivatives such as 2-methyl-1-vinylimidazole, 4-methyl-1-vinylimidazole, 5-methyl-1-vinylimidazole, 2-ethyl-1-vinylimidazole, 2-propyl-1-vinylimidazole, 2-isopropyl-1-vinylimidazole, 2-phenyl-1-vinylimidazole, 1-vinyl-4,5-benzimidazole, 2-vinylpyridine, 4-vinylpyridine and 2-methyl-5-vinylpyridine. Mixtures of basic vinylheterocycles can also be used.

Suitable crosslinkers are those which contain in the molecule two or more unconjugated vinyl groups which can be copolymerized by free radicals. Those which are particularly suitable are alkylenebisacrylamides such as methylenebisacrylamide and N,N'-bisacryloylethylenediamine, and N,N'-divinylethyleneurea (N,N'-divinylimidazolidone), N,N'-divinylpropyleneurea, ethylidene-bis-3-(N-vinylpyrrolidone), N,N'-divinyldiimidazolyl-(2,2')-1,4-butane and 1,1'-bis(3,3'-vinylbenzimidazolid-2-one)-1,4-butane. Other useful crosslinkers are, for example, alkylene glycol di(meth)acrylates, such as ethylene glycol di(meth) acrylate and tetramethylene glycol di(meth)acrylate, aromatic divinyl compounds such as divinylbenzene and divinyltoluene and allyl acrylate, divinyldioxane, pentaerythritol triallyl ether and mixtures of these. When polymerization takes place in the presence of water, only crosslinkers soluble in the aqueous monomer mixture are suitable.

The same applies to comonomers which can be copolymerized in amounts of up to 49.5%, preferably up to 40% by weight, based on the total monomer mixture. Comonomers which can be used are, for example, styrene, acrylic esters, vinyl esters, acrylamide, preferably N-vinyllactams such as 3-methyl-N-vinylpyrrolidone, in particular N-vinylcaprolactam and N-vinylpyrrolidone (VP).

To carry out the polymerization without solvent, the mixture of monomers, comprising basic vinylheterocycle, the crosslinker and with or without a comonomer, is rendered inert by introducing nitrogen and is then heated to from 100 to 200° C., preferably from 150 to 180° C. It is advantageous to pass a gentle nitrogen stream into the mixture. It is particularly advantageous to bring the batch to the boil by applying reduced pressure. Depending on the type of monomers used and the temperature selected, the mixture then polymerizes in the course of from 1 to 20 hours. For example, when 2-methyl-1-vinylimidazole is polymerized in the presence of 2% N,N'-divinylethyleneurea at 150° C. with agitation by a powerful agitator and at a pressure of 310 mbar, the first polymer particles form after 2.5 h, and after 10 h the batch comprises a brownish powder. After it is washed with water and dried, the polymer is obtained in the form of a coarse powder in yields of over 90%.

A preferred method of preparation is precipitation polymerization in water. The monomer concentration in the reaction batch is expediently chosen so that the batch remains readily stirrable over the entire period of the reaction. If there is insufficient water, the polymer granules actually become sticky, so that stirring becomes more difficult than without any water. With conventional stirred tanks, the expedient monomer concentration, based on the aqueous mixture, is from approximately 5 to 30% by weight, preferably from 8 to 15% by weight. It can be increased to 50% by weight if vigorous agitators are available. It can also be expedient to begin the polymerization with a relatively concentrated solution and then to dilute it with water in the course of the reaction. Polymerization is expediently carried out at a pH above 6, in order to avoid possible saponification of the comonomers and/or crosslinker. The pH can be adjusted by adding small amounts of bases such as sodium hydroxide or ammonia or conventional buffer salts such as soda, sodium hydrogen carbonate or sodium phosphate. Oxygen can be excluded by keeping the polymerization batch at the boiling point, and/or using an inert gas such as nitrogen, as mentioned above. The polymerization temperature can be from 30° to 150° C., preferably from 40 to 100° C.

It may occasionally be advantageous to add small amounts—from 0.01 to 1% by weight, based on the monomer mixture—of a reducing agent such as sodium sulfite, sodium pyrosulfite, sodium dithionite, ascorbic acid and the like, to completely remove dissolved oxygen prior to or at the beginning of the polymerization.

In a particularly preferred embodiment of the precipitation polymerization, the water-soluble comonomer (preferably VP or an N-vinyllactam), some of the crosslinker, water with or without a buffer and a reducing agent are heated in a gentle nitrogen stream until the first polymer particles appear. A mixture of the vinylheterocycle and the remaining crosslinker with or without water as diluent, after being rendered inert by blowing nitrogen through it, is then added in the course of from 0.2 to 6 hours.

Frequently, the start of polymerization can be accelerated by adding from 0.01 to 5% by weight, based on the monomer mixture, of a crosslinked polymer of low swellability based on basic vinylheterocycles having a $pK_a$ of at least 3.8 or vinyllactams, in particular N-vinylimidazole and N-vinylpyrrolidone.

The polymer produced from the aqueous suspension can be isolated by filtration or centrifugation with subsequent washing with water and drying in conventional dryers such as forced-air or vacuum drying cabinets, blade dryers or pneumatic dryers.

Although the polymers are prepared with the addition of only very small amounts of crosslinkers (preferably 1 to 4%, based on the total weight of the monomers used), they have very low swelling capacity in water, and do not form gels. In contrast, when the abovementioned monomers are polymerized in aqueous solution in the presence of an initiator and a crosslinker, crosslinked polymers of the gel type are obtained. The degree of crosslinking and thus the swelling properties are largely dependent in this case on the amount of crosslinker added. In order to prepare a polymer of the gel type which displays the same swelling properties as the polymers usable according to the invention, more than 20% by weight of crosslinker is required. The polymers used according to the invention are described in EP-A-438713, which is here completely incorporated by reference. The abovementioned properties also apply to the polymer-heavy metal ion complexes to be used according to the invention.

The complexes of the invention of the above described polymers with heavy metal ions, preferably irons of Cu, Ag, Au, Pd, Pt and In in various oxidation states, can be prepared in a simple manner by dissolving soluble salts of these metals in water at a pH from 3 to 10, preferably from 4 to 7 (exception In: pH<2) and suspending the polymer in this solution. The concentration of metal salt necessary to prepare the polymer complexes is in the range from 0.5 to 200 mM, the weight ratio of polymer to metal salt being preferably chosen so that the loading of the polymer with metal ions is in the range from 0.1 mg/g to 150 mg/g. The resulting polymer complex can be isolated conventionally from the aqueous suspension, eg. by filtering with subsequent washing with a sparing amount of water and drying in conventional dryers such as forced-air or vacuum drying cabinets.

The process of the invention for treating liquids, preferably beverages, is carried out by contacting the liquid with the polymer complex, preferably for a period of from 0.5 to a maximum of 24 hours, and in particular for a period of from 2 to 4 hours. This can be done batchwise by adding the polymer complex to the liquid and separating off the complex, eg. by filtering in a conventional manner, or else continuously via a column packed with the complex. In the batchwise treatment, which is preferred, it is expedient to stir the mixture. Preferably, the complex is allowed to settle and it is then resuspended. It can be expedient to repeat this operation once or several times.

Preferably, a complex is used having a particle size in the range from 0.5 μm to 1000 μm, 0.5–400 μm (median 30–40 μm) being preferred for the batch procedure and 30–1000 μm (median 150–200 μm) being preferred for the continuous procedure. The type of the polymer complexes and amount used depends on the type and amount of the compounds to be removed; generally from 1 to 200 g per hectoliter of liquid is used.

A particularly preferred use of the complexes of the invention is removing sulfur compounds from wine or wine-like beverages. For the purposes of the invention, wine-like beverages are, in particular, dessert wines, sparkling wines, carbonated wines and fruit and berry wines.

Small amounts of hydrogen sulfide in the wine result from yeast metabolism and can be detected in concentrations above 0.02 ppm as unpleasant foreign note (termed "Böckser" in German). They can prove to be a more serious sensory problem if thiols ("Mercaptanböckser"), dithiols or thioethers are formed therefrom in the course of time. To keep wines having defects of this type salable, the sulfur compounds with undesirable sensory properties must be removed by fining.

To remove sulfur compounds, wines have hitherto, with or without preheating, either been vigorously aerated or carbon dioxide or nitrogen has been passed through as fine bubbles. Addition of activated carbon can further reinforce this. However, this procedure has the disadvantage of greatly stressing the wine.

Alternatively, to remove sulfur compounds, soluble copper salts, such as copper sulfate, or silver compounds which have been precipitated onto silica gel or kieselguhr can be used, the exact dosage rate needing to be determined by preliminary tests. In comparison to the aeration technique, this procedure is more selective and even the Mercaptanböckser note can be eliminated using silver compounds. However, the heavy metal residues remaining in solution after the treatment need to be removed by a final fining.

The process most frequently used for this is blue fining, ie. precipitating the heavy metal ions using potassium hexacyanoferrate(II) as "blue sediment". In addition to process-specific problems, such as formation of prussic acid or colloidal heavy metal hexacyanoferrate(II), the cyanide-containing "blue sediment" is special waste, which must be disposed of appropriately.

By means of the complexes of the invention, hydrogen sulfide and organic sulfides can now be conveniently removed in a single process step with high selectivity in the manner described for liquids. It is advantageous to use the polymer complexes as a final fining measure prior to bottling. Obviously, use in an earlier stage of winemaking is also possible.

The examples illustrate the invention.

EXAMPLE 1

Preparation of Complexes of Copper(II) and Crosslinked vinylimidazole(VI)/vinylpyrrolidone (VP) Copolymer having a Monomer Ratio VI/VP= 9:1 a) Preparation of the Polymer

A mixture of 9 parts of N-vinylimidazole (VI), 1 part of N-vinylpyrrolidone (VP), 0.3 parts of N,N'-divinylimidazolidone, 100 parts of water and 0.1 parts of sodium hydroxide solution (5% strength) were introduced into a stirred apparatus having an attached reflux condenser and, with addition of 0.1 part of a crosslinked polymer of low swelling capacity based on VI and/or VP, were heated to 70° C. in a nitrogen stream and polymerized for 6 h at this temperature. The precipitation polymer obtained was filtered off by suction, thoroughly washed with water and dried in a forced-air cabinet at 60° C. A white granular product was obtained in a yield of 96.5%.

b) Preparation of the Complexes

The required amount of copper(II) salt was dissolved as copper sulfate pentahydrate as described in Table 1 in 500 ml of water and 100 g of the polymer as described in a) were added. The polymer was suspended for 4 hours with stirring. The solids were then filtered off, washed with a sparing amount of water and dried in a vacuum drying cabinet at 60° C. Depending on the amount of copper, light blue complexes colored to a greater or lesser extent were formed.

The copper content was determined by atomic absorption spectroscopy.

TABLE 1

| Polymer complex | Polymer [g] | $CuSO_4.5H_2O$ [mg] | Cu in polymer complex [mg/g] |
|---|---|---|---|
| 1 | 100 | 196.5 | 0.43 |
| 2 | 100 | 392.9 | 0.80 |
| 3 | 100 | 785.8 | 1.6 |
| 4 | 100 | 1964.6 | 3.9 |
| 5 | 100 | 3929.2 | 8.6 |

EXAMPLE 2

Preparation of Complexes of Palladium(II) and Crosslinked Polyvinylimidazole (crosslinker: N,N'-divinylimidazolidone, Content 3%)

The polymer was prepared by the method described in Example 1. The required amounts of palladium(II) salts were dissolved as palladium(II) nitrate as described in Table 2 in 300 ml of water and 50 g of the polymer were added to the solution. The polymer was suspended for 8 hours on a shaker. The solids were then filtered off, washed with a sparing amount of water and dried at 70° C. in a vacuum drying cabinet. The palladium content in the complex was determined by atomic absorption spectroscopy.

TABLE 2

| Polymer complex | Polymer [g] | $Pd(NO_3)_2$ [mg] | Pd in polymer complex [mg/g] |
|---|---|---|---|
| 6 | 25 | 270.7 | 2.6 |
| 7 | 25 | 541.4 | 5.3 |

EXAMPLE b 3

Preparation of complexes from silver(I) and crosslinked polyvinylimidazole (crosslinker: divinylimidazolidone, content 3%)

The silver(I) complexes were prepared by a method similar to that of Example 2 using the amounts specified in Table 3.

TABLE 3

| Polymer complex | Polymer [g] | $AgNO_3$ [mg] | Ag in polymer complex [mg/g] |
|---|---|---|---|
| 8 | 80 | 252.0 | 1.9 |
| 9 | 80 | 504.0 | 3.8 |
| 10 | 80 | 1008.0 | 7.5 |

EXAMPLE 4

Treating a Simulated Wine, Admixed with 1 mg/kg of $Na_2S$, with the Polymer Complexes 5, 6 or 10

Sample Preparation 100 ml of simulated wine, comprising 5.0 g/l of tartaric acid, 5.0 g/l of malic acid, 2.0 g/l of potassium acetate, 100 ml/l of ethanol (96% strength) and water, were spiked with 0.1 mg of $Na_2S$ (null sample). 100 ml aliquots of spiked simulated wine were each admixed with 50 mg of the polymer complex (see Table 4) in gastight sealable vessels and shaken intensively for 2 hours.

Analysis

After filtration, 2 ml of sample liquid were introduced into a head space gas collection tube and this was sealed to be gastight. An aliquot of the head space gas phase was then analyzed by gas chromatography, using an element-specific detector (atomic emission detector (AED): recorded traces: C and S). The results are summarized in Table 4.

TABLE 4

| | $H_2S$ content [ppm] | Adsorption [%] |
|---|---|---|
| Null sample | 1.00 | 0 |
| After treatment with polymer complex 5 | + | 100 |
| After treatment with polymer complex 6 | + | 100 |
| After treatment with polymer complex 10 | + | 100 |

+below the detection limit

EXAMPLE 5

Treatment of a Simulated Wine, Admixed with 1 mg/kg of Sodium Methanethiolate, with the Polymer Complexes 5, 6 or 10

Analysis and sample preparation were performed as described in Example 4. The results are summarized in Table 5.

TABLE 5

| | Content of ethanethiol [ppm] | Adsorption [%] | Content of diethyl disulfide [ppm] | Adsorption [%] |
|---|---|---|---|---|
| Null sample | 0.78 | 0 | 0.22 | 0 |
| After treatment with polymer complex 5 | 0.56 | 28.3 | 0.15 | 31.8 |

TABLE 5-continued

| | Content of ethanethiol [ppm] | Adsorption [%] | Content of diethyl disulfide [ppm] | Adsorption [%] |
|---|---|---|---|---|
| After treatment with polymer complex 6 | 0.02 | 97.5 | 0.13 | 41.0 |
| After treatment with polymer complex 10 | + | 100 | 0.10 | 54.6 |

+below the detection limit

EXAMPLE 6

Treating a wine having hydrogen sulfide Böckser note with the crosslinked vinylimidazole/ vinylpyrrolidone copolymer-copper(II) complex (polymer complex 4)

5 l of a wine having a clearly perceptible hydrogen sulfide Böckser note ($H_2S$ content: 0.53 ppm) were admixed with 5.0 g of polymer complex 4 in a gastight glass container without a head space and the complex was suspended in the wine over a period of 3 hours. The wine was then filtered and tasted. The characteristic Böckser note was no longer detected.

EXAMPLE 7

Treating a wine having an uncharacteristic Böckser odor with crosslinked polyvinylimidazole-silver(I) complex (polymer complex 10)

20 l of a white wine having a marked Böckser odor, which could not be characterized more precisely, however, were admixed with 800 mg of polymer complex 10 in a gastight glass balloon flask and the complex was suspended in the wine for a period of 2.5 hours. The wine was then filtered and tasted. The Böckser odor was no longer detected.

EXAMPLE 8

Treating a wine having a mercaptan Böckser odor with the polymer complexes 5, 6 and 10

10 l lots of a white wine containing 0.74 mg/l of ethanethiol and 0.057 mg/l of diethyl sulfide were each admixed with g of polymer complex (see Table 6) in a gastight glass container and the complex was suspended in the wine over a period of 2 h. The wine was then filtered and analyzed by the method described in Example 4. The results are summarized in Table 6.

TABLE 6

| Sample | Content of ethanethiol (in ppm) | Adsorption (%) | Content of diethyl sulfide (in ppm) | Adsorption (%) |
|---|---|---|---|---|
| Wine prior to treatment | 0.74 | 0 | 0.057 | 0 |
| After treatment with polymer complex 5 | 0.73 | 1.4 | 0.053 | 7.0 |
| After treatment with polymer complex 6 | + | 100 | 0.043 | 24.6 |
| After treatment with polymer complex 10 | + | 100 | + | 100 |

+below the detection limit

We claim:
1. In a process for removing compounds which have an affinity for heavy metal ions from liquids which process comprises contacting the liquid with an absorbent, the improvement which comprises using as the absorbent a complex of
   i) heavy metal ions selected from the group consisting of the ions of Cu, Ag, Au, Pt and In, and
   ii) a polymer which contains 50–99.5% by weight of at least one vinylheterocycle having a $pK_a$ of at least 3.8 and, copolymerized, 0–49.5% by weight of another copolymerizable monomer and which is obtained in the absence of a polymerization initiator in the presence of 0.5–10% by weight of a crosslinker, based on the monomers,
   which complex comprises from 0.1 to 150 mg of the metal ions per g of the polymer.
2. The process of claim 1, wherein the liquid is passed over a column packed with the complex of heavy metal ions and the polymer.
3. The process of claim 1, wherein the absorbent has a particle size of from 0.5 to 1000 μm.
4. The process of claim 1, wherein the heavy metal ion is selected from the group consisting of Ag, Au, Pd and In ions.
5. The process of claim 4, wherein the complex comprises at least 0.8 mg of the metal ion per g of the polymer.
6. The process of claim 4, wherein the complex comprises at least 1.6 mg of the metal ion per g of the polymer.
7. The process of claim 2, wherein the heavy metal ion is selected from the group consisting of Ag, Au, Pd and In ions.
8. The process of claim 7, wherein the complex comprises at least 0.8 mg of the metal ion per g of the polymer.
9. The process of claim 7, wherein the complex comprises at least 1.6 mg of the metal ion per g of the polymer.
10. The process of claim 1, wherein the absorbent and the liquid are contacted for not more than 3 hours.
11. The process of claim 10, wherein the complex comprises at least 8.6 mg of the metal ion per g of the polymer.
12. The process of claim 1, wherein the absorbent and the liquid are contacted for not more than 2.5 hours.
13. The process of claim 1, wherein the absorbent and the liquid are contacted for not more than 2 hours.
14. The process of claim 1, wherein the complex comprises at least 8.6 mg of the metal ion per g of the polymer.
15. The process of claim 1, wherein the liquid is wine or wine-like beverages.
16. The process of claim 1, wherein the compounds that are removed from the liquids are organic or inorganic sulfur compounds.
17. The process of claim 1, wherein 1 to 200 g of complex are used per hectoliter of liquid.

* * * * *